United States Patent

Shimada et al.

[11] Patent Number: 5,938,170
[45] Date of Patent: Aug. 17, 1999

[54] PROPORTIONAL CONTROL SOLENOID RELIEF VALVE

[75] Inventors: Yoshiyuki Shimada, Kobe; Tetsuya Yoshino, Akashi, both of Japan

[73] Assignee: Shin Caterpiller Mitsubishi Co., Ltd., Japan

[21] Appl. No.: 08/827,964

[22] Filed: Apr. 7, 1997

[51] Int. Cl.[6] .................................................. F16K 31/02
[52] U.S. Cl. ...................................... 251/30.02; 251/903
[58] Field of Search ............................. 251/30.01, 30.02, 251/30.03, 30.04, 38, 903, 25, 28, 359, 360

[56] References Cited

U.S. PATENT DOCUMENTS

| | | | |
|---|---|---|---|
| 3,477,466 | 11/1969 | Sturm .............................. | 251/30.02 X |
| 4,624,441 | 11/1986 | Kreitchman et al. ................ | 251/30.01 |
| 5,232,195 | 8/1993 | Torrielli .............................. | 251/903 X |
| 5,660,368 | 8/1997 | De Matthaeis et al. ............. | 251/30.02 |

*Primary Examiner*—Kevin Lee
*Attorney, Agent, or Firm*—Morrison Law Firm

[57] ABSTRACT

A pilot-operated proportional control electromagnetic relief valve has a needle guide portion snugly fitted around the outer surface of a needle. The needle guide portion guides vertical movement of the needle, and is located at the center of a stopper so as to be coaxial with the stopper. A cylindrical inner wall portion of the stopper is so bored in the lower part of the adapter as to be coaxial with the needle guide portion. A cylindrical outer wall portion to be snugly fitted in the cylindrical inner positioning wall portion is so formed around the outer surface of a seat as to be coaxial with the seat portion. The outer circumferential surface of the needle is snugly fitted in the needle guide portion of the adapter so that the needle guide portion guides the axial travel of the needle, and the cylindrical inner wall portion of the adapter and the cylindrical outer wall portion of the seat are snugly fitted together. The needle can therefore be properly seated without the danger of the needle being in off-center contact with the seat portion.

5 Claims, 3 Drawing Sheets

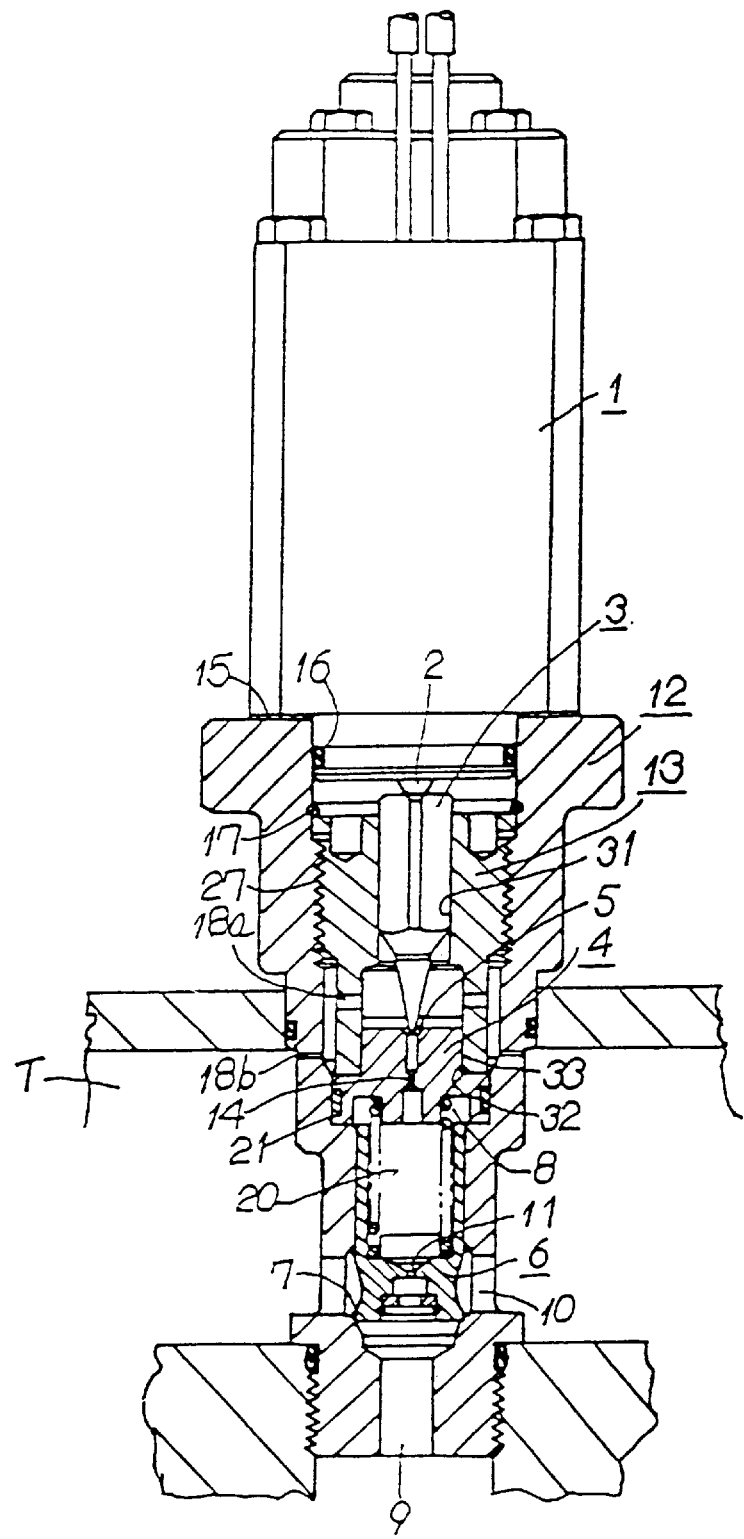
F I G. 1

PROPORTIONAL CONTROL SOLENOID RELIEF VALVE

BACKGROUND OF THE INVENTION

The present invention relates to a proportional control electromagnetic relief valve. More particularly, the present invention relates to a proportional control electromagnetic relief valve having an improved means to position and hold a valve needle in the proper orientation, so that the needle is maintained in proper contact with a seat.

Referring now to FIG. 2, an example of a conventional proportional control electromagnetic relief valve is shown. A proportional control electromagnetic solenoid 1 is attached to the upper part of a valve body 12. One end of a needle 3 is disposed at the end of a push rod 2 which is moved by solenoid 1 in the axial direction, and a pilot stage seat portion 5 of a seat 4 fitted in valve body 12 is disposed at the other end of needle 3. An orifice 14 is formed at the center of seat 4. The inner wall of an axially extending hole bored through an adapter 13 serves as a guide portion 22 for guiding needle 3.

A main poppet 6, capable of freely sliding in valve body 12 in the axial direction, is disposed below seat 4. An orifice 11 is formed at the center of main poppet 6. Main poppet 6 is biased against a main seat 7 by a return spring 8. Main seat 7 is located between an inlet port 9 and a tank port 10, which are both bored in the lower part of valve body 12 in such a manner that inlet port 9 and tank port 10 extend in the axial direction and in the radial direction, respectively. A seat inserting portion 21 for inserting and fitting seat 4 in a fluid tight state is formed on the inner face of valve body 12, at a location above a spring chamber 20 for fitting return spring 8.

Conduit passages 18a and 18b are bored through adapter 13 and valve body 12, respectively, so that the space located between seat 4 and adapter 13 communicates to the outside of valve body 12, in this case a tank T. In other words, the space between seat 4 and adapter 13 which extends in the radial direction communicates with the inside of tank T through these conduit passages 18a, 18b.

Shims 15 are sandwiched between solenoid 1 and valve body 12 so that the operating distance of needle 3 with respect to that of push rod 2 can be adjusted by increasing or reducing the number of shims 15. Thus, the set pressure can be adjusted. The space between solenoid 1 and valve body 12 is kept fluid-tight by an O-ring 16. Seat 4 is fastened to the inner side of valve body 12 with screw-in type adapter 13. There is a space 19, extending in the axial direction, between seat 4 and adapter 13. The upper end of adapter 13 is held by a stop ring 17.

The operation of the conventional proportional control electromagnetic relief valve is now described. First, solenoid 1 pushes needle 3 through push rod 2 with a thrusting force $F_1$ which is proportional to a current value I (expressed in amperes). When push rod 2 pushes needle 3, thereby pressing the end of needle 3 against pilot stage seat portion 5 of seat 4, thrusting force $F_1$ and current value I are in the following proportional relationship, as illustrated in FIG. 3:

$$F_1 = k_1 \cdot I \tag{1}$$

where $k_1$ is a proportional constant.

Now, $A_p$ represents the area receiving the pressure at the end of needle 3 fitted in seat portion 5 of seat 4, while $A_m$ represents the area of main poppet 6 which receives the pressure, both at the upstream side and downstream side of poppet 6 with respect to orifice 11. A preset load of return spring 8 is represented by $F_2$.

Where an inlet pressure $P_{IN}$ at inlet port 9 is lower than $F_1/A_p$, inlet pressure $P_{IN}$ and the pressure in spring chamber 20 are equal, because seat portion 5 is closed. Therefore, main poppet 6 is pushed against main seat portion 7 by return spring 8, and the communicative passage between inlet port 9 and tank port 10 is blocked.

When $P_{IN}$ increases to the state where $P_{IN} = F_1/A_p$(2), needle 3 is pushed upward, thereby opening seat portion 5 so that pilot fluid flows from inlet port 9 through orifice 11, spring chamber 20, orifice 14 of seat 4 and then through conduit passages 18a, 18b into tank T at a pilot flow rate $Q_1$. Granting that the tank pressure is zero for the sake of convenience, the difference in pressure between the areas in the front and rear of orifice 11, i. e. the differential pressure $\Delta P$ represented by the following equation (3), is generated:

$$Q_1 = k_2 \cdot A_3 \cdot (\Delta P)^{1/2} \tag{3}$$

where $k_2$ and $A_3$ represent a proportional constant and a cross section of the aperture of orifice 11, respectively.

When the pressure acting on main poppet 6 with respect to the preset load $F_2$ of return spring 8 becomes $F_2 \leq A_m \cdot \Delta P$, main poppet 6 is pushed upward, thereby opening the passage between inlet port 9 and tank port 10 while maintaining the state represented by equation (2). In other words, inlet pressure $P_{IN}$ is set at a desired value by current value I in accord with equations (1) and (2).

A conventional proportional control electromagnetic relief valve described above has needle guide portion 22 in adapter 13. Guide portion 22 limits the undesirable inclination of needle 3 away from an axial direction. Guide portion 22 therefore prevents pressure hunting and improper pressure rise which may result from improper seating of needle 3 in seat 4 due to off-center contact when the end of needle 3 is pushed by push rod 2 against seat portion 5.

The gap between guide portion 22 and needle 3 must be kept to a minimum. Otherwise, guide portion 22 would fail to function properly, permitting needle 3 to incline to a large degree. The discrepancy in axial alignment between any two coaxial members is hereinafter referred to as the degree of noncoaxiality. It is unavoidable that the degree of coaxiality between guide portion 22 of adapter 13 and seat portion 5 of seat 4 is disadvantageously large, because it is an accumulation of respective degrees of noncoaxiality of other members. Reducing the clearance between guide portion 22 and needle 3 to a small distance may cause the end of needle 3 to abut against only one side of seat portion 5, and cause pressure hunting or improper pressure rise. Consequently, reducing the clearance between guide portion 22 and needle 3 can often produce a result opposite to that intended.

The aforementioned accumulation of respective degrees of noncoaxiality of various members includes (i) a degree of noncoaxiality between the end of needle 3 and the outer perimeter of needle 3, (ii) a degree of noncoaxiality between the inner diameter of guide portion 22 of adapter 13 and the outer threaded portion of adapter 13, (iii) a degree of noncoaxiality between an adapter-mounting threaded portion 27 of valve body 12 and seat insertion portion 21 in which the outer surface of seat 4 is fitted, and (iv) a degree of noncoaxiality between seat portion 5 and the outer circumferential surface of seat 4. In particular, the coaxialities of (ii) and (iv) above are especially prone to undesirable deviation from a coaxial orientation.

For this reason, the conventional configuration requires some degree of clearance between guide portion 22 and needle 3. For example, the clearance between guide portion 22 and needle 3 in the conventional device of FIG. 2 is approximately 0.3 mm. Therefore, it is desirable to provide a means to ensure that needle 3 remains in the proper orientation with respect to seat portion 5, to minimize pressure hunting or improper pressure rise.

OBJECTS AND SUMMARY OF THE INVENTION

Accordingly, it is an object of the present invention to provide a pilot operated proportional control electromagnetic relief valve that overcomes the limitations of the prior art.

It is a further object of the present invention to provide a pilot operated proportional control electromagnetic relief valve that moves a valve needle in the axial direction in response to an axial thrusting force generated in proportion to a current value of a solenoid, without the danger of an end of the needle being incorrectly oriented with respect to a seat portion.

It is a further object of the present invention to provide a pilot operated proportional control electromagnetic relief valve with a limited accumulation of degrees of noncoaxiality of the various members of the valve.

Briefly stated, a pilot-operated proportional control electromagnetic relief valve has a needle guide portion snugly fitted around the outer surface of a needle. The needle guide portion guides vertical movement of the needle, and is located at the center of a stopper so as to be coaxial with the stopper. A cylindrical inner wall portion of the stopper is so bored in the lower part of the adapter as to be coaxial with the needle guide portion. A cylindrical outer wall portion to be snugly fitted in the cylindrical inner positioning wall portion is so formed around the outer surface of a seat as to be coaxial with the seat portion. The outer circumferential surface of the needle is snugly fitted in the needle guide portion of the adapter so that the needle guide portion guides the axial travel of the needle, and the cylindrical inner wall portion of the adapter and the cylindrical outer wall portion of the eat are snugly fitted together. The needle can therefore be properly seated without the danger of the needle being in off-center contact with the seat portion.

According to an embodiment of the present invention, there is provided a proportional control electromagnetic relief valve which comprises a stopper, disposed within a valve body of the relief valve, a needle guide portion, a needle, moveably disposed within the needle guide portion, the needle guide portion being bored in a first end of the stopper, and fitting snugly around an outer surface of the needle so as to guide axial motion of the needle, a first end of the needle facing a seat portion, a cylindrical inner wall portion, formed in a second end of the stopper opposite the first end and coaxial with the needle guide portion, and a cylindrical outer wall portion, fitting snugly in the inner wall portion and coaxial with the seat portion.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a sectional view of a proportional control electromagnetic relief valve according to an embodiment of the present invention.

DETAILED DESCRIPTION OF THE PREFERRED EMBODIMENT

Figure 2:
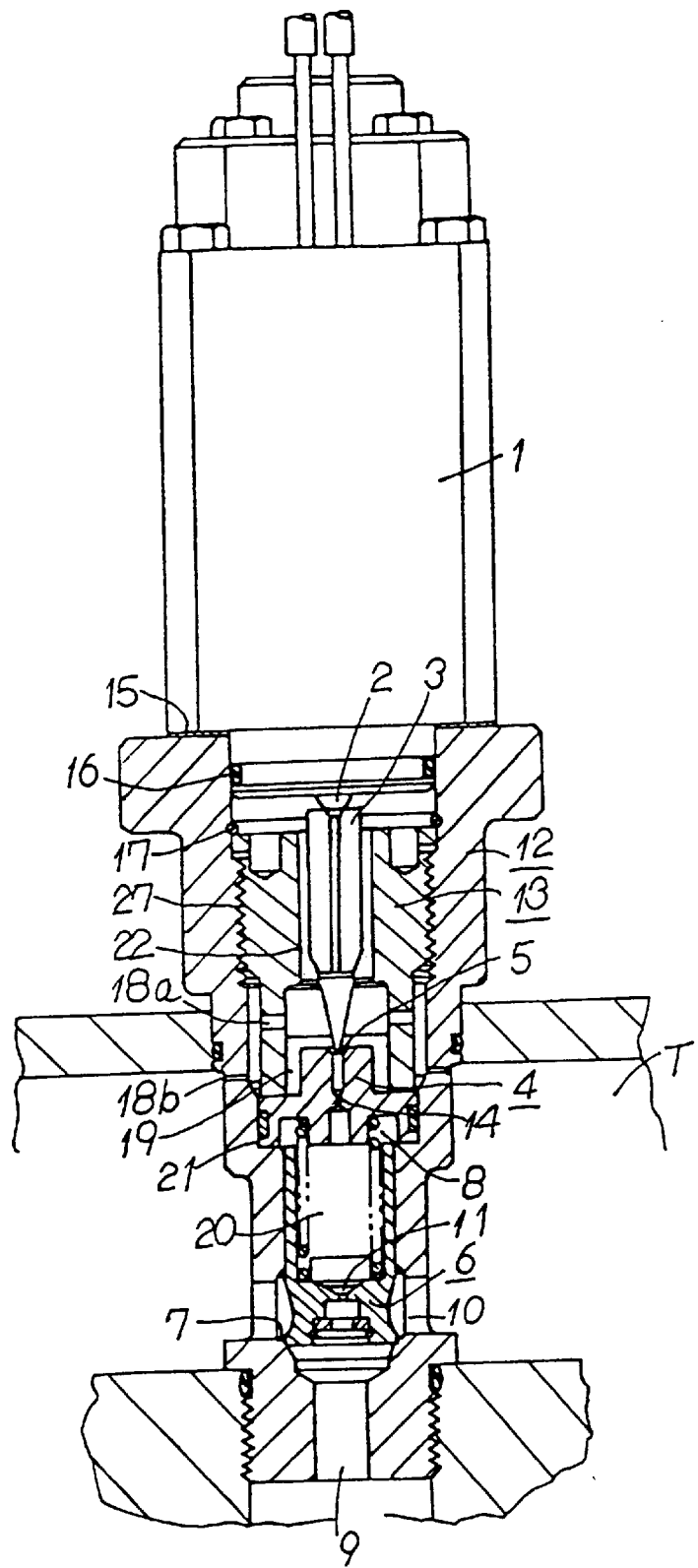
FIG. 2 is a sectional view of a conventional proportional control electromagnetic relief valve.
Figure 3:
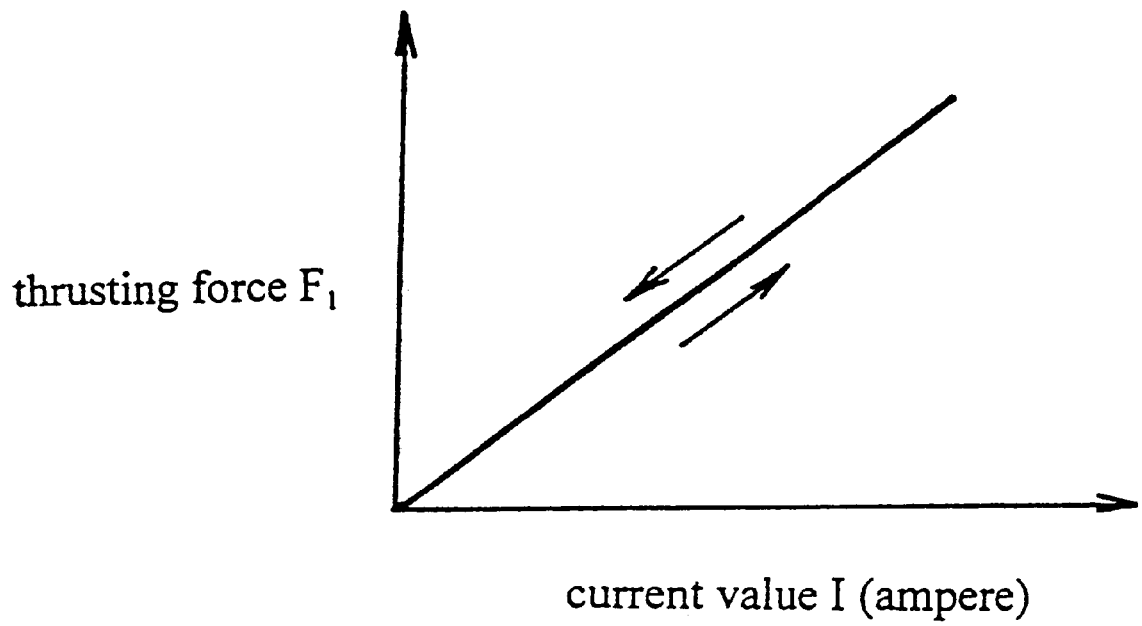
FIG. 3 is a graph showing the relationship between thrusting force $F_1$ and the solenoid current of a conventional proportional control electromagnetic relief valve.

Referring now to FIG. 1, the present invention provides a needle guide portion 31 for guiding needle 3. More precisely, needle guide portion 31 is bored through the center of adapter 13 so as to be coaxial with adapter 13. Needle 3 is snugly fitted in needle guide portion 31 in such a manner as to be capable of moving freely in an axial direction.

A cylindrical inner wall portion 32 is so bored in the lower part of adapter 13 as to be coaxial with needle guide portion 31. A cylindrical outer wall portion 33 to be snugly fitted in the aforementioned cylindrical inner wall portion 32 is so formed around the outer surface of seat 4 as to be coaxial with pilot stage seat portion 5 at the center of seat 4. Needle guide portion 31 and cylindrical inner wall portion 32 may be bored by any appropriate means, such as, for example, turning. Cylindrical outer wall portion 33 likewise may be formed by any appropriate means, such as, for example, turning.

The outer circumferential surface of needle 3 fits snugly in needle guide portion 31 of adapter 13, so that needle guide portion 31 guides the axial travel of needle 3. The distance between needle 3 and needle guide portion is preferably less than 0.05 mm. At the same time, the outer circumferential surface of needle 3 is free to move in an axial direction within adapter 13. Cylindrical outer wall portion 33 of seat 4 fits snugly in cylindrical inner wall portion 32 to properly position adapter 13. Adapter 13 further serves as a stopper.

With the above configuration, the degree of noncoaxiality between the inner diameter of needle guide portion 31 and cylindrical inner wall portion 32 of adapter 13 is minimized, and the space between cylindrical inner wall portion 32 and cylindrical outer wall portion 33 is also reduced to a minimum. Therefore, the degree of noncoaxiality between the inner diameter of needle guide portion 31 of adapter 13 and seat portion 5 is substantially smaller than that of a conventional valve.

The above configuration is free from influences of the aforementioned factors which are the principal causes of noncoaxiality in conventional products, namely the degree of noncoaxiality between the outer threaded portion of adapter 13 and the inner diameter of needle guide portion 31, and the degree of noncoaxiality between an adapter-mounting threaded portion 27 of valve body 12 and seat insertion portion 2. The present invention minimizes the space between needle 3 and needle guide portion 31, thereby allowing needle guide portion 31 to accurately guide the axial motion of needle 3. Thus, the present invention effectively prevents pressure hunting and improper pressure rise, which are often caused by improper contact of needle 3 with seat portion 5, as described above.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A proportional control electromagnetic relief valve, comprising:

a stopper, disposed within a valve body of said relief valve;

a needle guide portion;

a needle, moveably disposed within said needle guide portion;

said needle guide portion being disposed in a first end of said stopper, and fitting snugly around an outer surface of said needle and effective to guide axial motion of said needle;

a first end of said needle facing a seat portion;

a cylindrical inner wall portion, formed in a second end of said stopper opposite said first end of said stopper and coaxial with said needle guide portion; and said seat having a cylindrical outer wall portion, fitting snugly in said inner wall portion.

2. A proportional control electromagnetic relief valve according to claim 1, wherein at least one of said needle guide portion, said cylindrical inner wall portion, and said cylindrical outer wall portion is formed by turning.

3. A proportional control electromagnetic relief valve according to claim 1, further comprising:

a proportional control electromagnetic solenoid;

a push rod;

said push rod being moved by said solenoid in an axial direction in response to a current supplied to said solenoid; and said push rod being disposed at a second opposite end of said needle.

4. A proportional control electromagnetic relief valve according to claim 1, further comprising:

a main poppet;

said main poppet being between an inlet port of said valve body and a tank port of said valve body; and said poppet being controlled by movement of said needle in an axial direction to permit flow of fluid through an orifice in said poppet.

5. A proportional control electromagnetic relief valve, comprising:

a stopper, disposed within a valve body of said relief valve;

a needle guide portion;

a needle, moveably disposed within said needle guide portion;

said needle guide portion being disposed in a first end of said stopper, and fitting snugly around an outer surface of said needle and effective to guide axial motion of said needle;

said needle guide and said outer surface are separated by a distance less than 0.05 millimeters;

a first end of said needle facing a seat portion;

a cylindrical inner wall portion, formed in a second end of said stopper opposite said first end of said stopper and coaxial with said needle guide portion; and said seat having a cylindrical outer wall portion, fitting snugly in said inner wall portion.

* * * * *